United States Patent [19]
Simpson

[11] 3,947,188
[45] Mar. 30, 1976

[54] VARIABLE CONJUGATE OPTICAL SYSTEM

[75] Inventor: George R. Simpson, Rochester, N.Y.

[73] Assignee: Xerox Corporation, Stamford, Conn.

[22] Filed: Nov. 11, 1974

[21] Appl. No.: 522,665

[52] U.S. Cl. .................. 353/76; 353/99; 353/101; 355/57
[51] Int. Cl.² .................. G03B 21/28; G03B 27/34
[58] Field of Search .......... 353/66, 67, 99, 76, 101; 355/55, 57, 60

[56] References Cited
UNITED STATES PATENTS

| | | | |
|---|---|---|---|
| 3,489,494 | 1/1970 | Snider | 353/67 |
| 3,604,795 | 9/1971 | Crandall | 353/76 |
| 3,792,926 | 2/1974 | Knechtel | 355/60 |

Primary Examiner—Richard E. Aegerter
Assistant Examiner—A. J. Mirabito
Attorney, Agent, or Firm—Robert J. Bird

[57] ABSTRACT

An optical system for projecting an image of an object, operating between fixed object and image planes. Both the object conjugate and the image conjugate are variable to vary the magnification in the system. This is accomplished without moving the optical axis by means of a first roof mirror on the object side of the lens and a second roof mirror on the image side of the lens. These mirrors each fold the optical axis by 90° and are movable along a locus at 45° to the optical axis to change the object and image distances.

8 Claims, 3 Drawing Figures

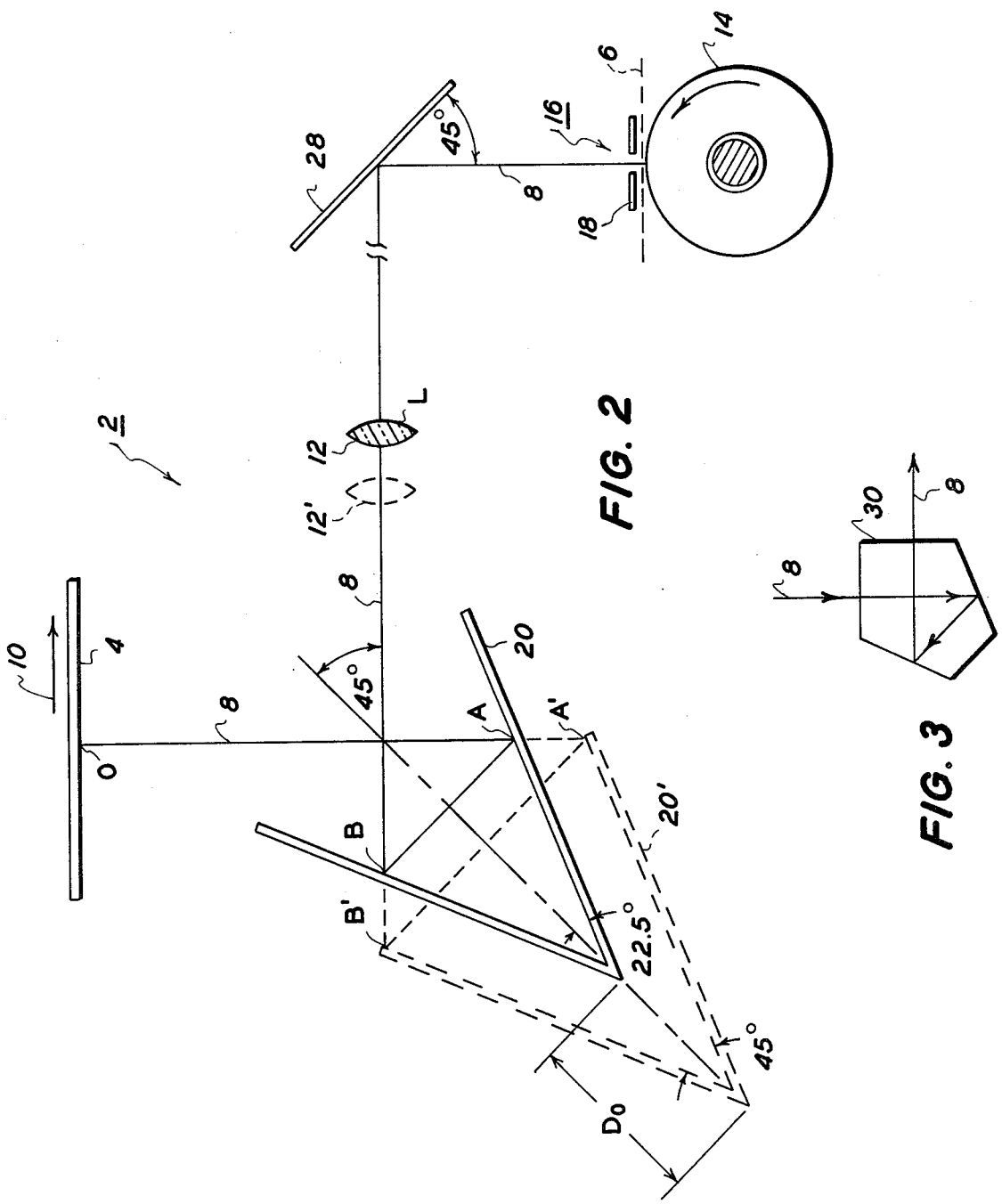

VARIABLE CONJUGATE OPTICAL SYSTEM

BACKGROUND OF THE INVENTION

The present invention relates in general to an optical imaging system and more particularly to an optical imaging system useful for projecting images of variable magnification between a fixed object plane and a fixed image plane.

This invention is intended for use in a photocopying environment, though it will be appreciated that its usefulness is not limited to that.

In photocopying machines a light image of the object being copied is projected by means of a lens onto a photosensitive image surface which is then used to make a permanent record of the original object. This is sometimes done by full frame exposure and sometimes by scanning of the original in which a composite image is developed by scanning and projecting incremental portions of the objects. There are numerous ways to perform the scanning function just described. However, it will facilitate an understanding of this invention to describe it in connection with an arrangement in which a moving object is passed over a fixed illuminating apparatus and is imaged on an image member moving synchronously with the moving object. It is to be noted that this aspect of the description is background or environment only and is not a material part of the invention.

In the prior art, image projection systems providing for variable magnification are known and they take several forms. A varifocal or zoom lens between object and image is one known solution. Another is the add-lens arrangement. In yet another type of system, the optical axis between object and image is moved and folded through varying angles to accommodate changes in total conjugate length. In these systems, generally it is necessary to move the imaging lens. Also it is inherent in some such systems that the optical axis is shifted through lateral or angular displacements which must be accommodated.

SUMMARY OF THE INVENTION

It is an object of the present invention to provide a variable magnification projection system which operates between fixed conjugate planes.

Another object of the present invention is to provide a variable magnification projection system which operates between fixed conjugate planes and does not require the movement of the optical axis.

Another object of the present invention is to provide a variable magnification projection system which operates between fixed conjugate planes and without movement of the projection lens or of the optical axis.

Briefly, this invention is practiced on one form by an optical system which includes, between object and image planes, a first roof mirror to fold the optical axis by 90°, a projection lens, and a second roof mirror to fold the optical axis by 90°. Movement of one or the other, or both, of the roof mirrors along a 45° axis relative to the optical axis varies the conjugate distance as desired on each side of the projection lens without displacing the optical axis laterally or angularly.

For a better understanding of this invention, reference is made to the following detailed description given in connection with the accompanying drawing.

DRAWING

FIG. 2 is a schematic optical design of an alternate arrangement.

FIG. 3 is a diagram of a penta prism which may be used in the practice of this invention.

DESCRIPTION

Figure 1:
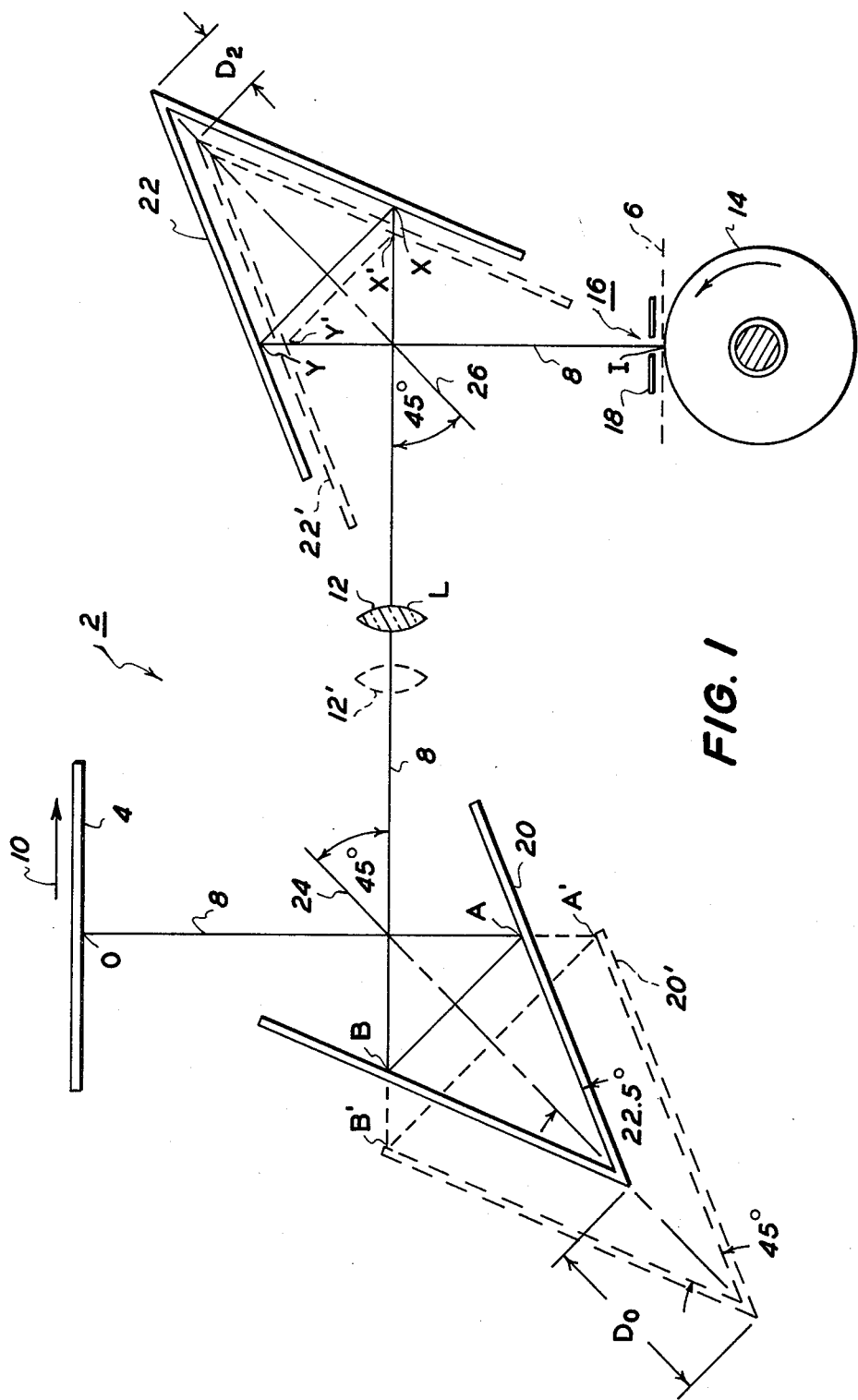
FIG. 1 is a schematic optical diagram, representative of an elevation view of an optical system according to the present invention.

FIG. 1 schematically represents the optical system of a photocopying apparatus generally indicated at 2. An object surface or object plane 4 and an image plane 6 are shown at opposite ends of an optical axis 8. In one embodiment an original object indicated by the arrow 10 is mounted on the object surface 4 for movement as shown relative to the optical axis 8 to project an image at image 6 of the object 10. A movable or rotatable photoconductive drum or surface 14 is disposed at the image surface 6, and a narrow exposure slit 16 is defined by a suitable stop member 18 so as to expose on the photoconductive drum 14 only a line at a time. Thus, as the object 10 moves relative to the optical axis 8 in synchronism with the movement of the photoconductive drum 14, a composite image of the object 10 is projected onto the drum 14.

The optical system 2 further includes a 45° roof mirror 20 on the object side of lens 12 and a 45° roof mirror 22 on the image side of lens 12. The roof mirror 20 is positioned such that its center line or axis of symmetry 24 is at 45° relative to the optical axis 8. Similarly, the roof mirror 22 is positioned with its axis 26 at 45° relative to the optical axis 8. Each roof mirror is effective to fold the optical axis 8 by 90° after two reflections.

Optical axis 8 is also referred to herein in terms of its path segments. Thus optical path OABLXYI is the sum of the paths from O (object) to A (reflector) to B (reflector) to L (lens) to X (reflector) to Y (reflector) to I (image).

In the arrangement shown in solid lines, roof mirrors 20 and 22 are so positioned that the object conjugate is equal to the image conjugate for unit magnification. In other words, object distance OABL is equal to image distance LXYI.

The total conjugate (TC) of lens 12 is equal to the sum of its object conjugate (S) and its image conjugate (S').

The object conjugate $S$ is expressed by the relationship $$(1) \quad S = \frac{m+1}{m} f$$

where
$m$ = magnification
$f$ = lens focal length

The image conjugate $S'$ is expressed by the relationship $$(2) \quad S' = (m+1)f$$

The total conjugate is therefore expressed by the following relationship $$(3) \quad TC = \frac{m+1}{m} f + (m+1)f = \frac{(m+1)^2}{m} f$$

In the unit magnification case of lens 12, shown in solid lines, $TC=4f$, $S=2f$, and $S'=2f$.

If it is desired to change the magnification, equation (3) above provides the parameters of object conjugate, image conjugate, and total conjugate required to achieve the result. As an example, a desired magnification of 0.5X, put into equation (3) gives the required parameters of $TC=4.5f$, $S=3f$ and $S'=1.5f$. The change in value S from 1X to 0.5X magnification is equal to $1f$, an absolute value since $f$ is constant. Similarly, the change in S' from 1X to 0.5X magnification is equal to $0.5f$.

The object conjugate S and the image conjugate S' can be changed to meet the above requirements by translating the roof mirrors 20 and 22 respectively to other positions, exemplified by 20' and 22'. It can be shown that the change in object conjugate S resulting from a roof mirror displacement $D_0$ is according to the relationship $\Delta S = D_o \sqrt{2}$. Similarly, the change in the image conjugate S' resulting from a roof mirror displacement $D_i$ is according to the relationship $\Delta S' = D_i \sqrt{2}$.

Transposing the terms, it is found that the required displacement of the object roof mirror 20 to achieve a required $\Delta S$ is equal to $\Delta S/\sqrt{2}$. Similarly, the required displacement of the image roof mirror 22 to achieve a required $\Delta S'$ is equal to $\Delta S'/\sqrt{2}$. Again, the values of $\Delta S$ and $\Delta S'$ are obtainable from solution of equation (3) and computation involving the value of $f$.

In the optical system just described, it will be apparent that through the magnification change there was no change in the object position, no change in the image position, no change in the lens position and no change in either the lateral or angular position of the optical axis.

It will be seen with reference to the drawings, that, in any position of the object roof mirror 20 along the axis 24, the optical axis OA is coincident with OA' and BL is coincident with B'L. Similarly, in whatever position of the image roof mirror 22 along its axis 26, the optical axis LX is coincident with LX' and YI is coincident with Y'I.

In a second embodiment, it is possible to move the lens along the optical axis and in conjunction with such lens movement to move only one or the other of the roof mirrors 20 or 22. The required movements are dictated by the foregoing equation (3). It is a possible advantage of this embodiment that only one mirror assembly moves and that the required translation of such mirror assembly is smaller than in the case where the lens remains stationary.

In a third embodiment, it is possible to have the lens 12 and both roof mirrors 20 and 22 arranged to move interdependently along their respective axes. Again the parameters of such an arrangement are dictated by the equation (3). In this arrangement the total required movement of all movable elements is less than in the preceding case in which the lens is stationary or in which one of the mirrors is stationary. The selection of any of these embodiments is a subject of practical considerations of machine configuration, cost, and complexity of mechanism.

All of the foregoing embodiments have been described with reference to a photocopying system of the image transfer type in which an even number of reflections is required in the optical system between object and image. In a direct imaging system an odd number of reflections is required in the propagation of the image. The present invention may be employed in such a system simply by replacing one or the other of the roof mirrors by a single plane mirror. FIG. 2 is a schematic representation of a three-mirror direct imaging system. In this arrangement, the plane mirror 28 will remain fixed while the lens and the single roof mirror move to effect magnification changes. It will be appreciated that the arrangement of mirrors as shown in FIG. 2 can be reversed. The plane mirror 28 is shown here on the image side of the lens, but may be used on the object side with the roof mirror located on the image side.

In all of the foregoing modifications, it will be apparent that it is not essential whether one roof mirror moves or whether two roof mirrors move or whether two roof mirrors and the lens move. These are questions of satisfying the requirements of equation (3). The essential points are that the movement of these various elements does not laterally or angularly displace the optical axis and that the object and image planes are not required to move.

An additional advantage of the 45° roof mirror (or penta prism) is that it deflects the incident light beam by 90° regardless of the orientation of the roof. That is, the roof may be inclined relative to the axis (24 or 26) and still be effective to deflect the optical axis by 90°. Consequently, practical considerations of alignment and the like are eased.

Another benefit derived from this arrangement discosed herein is that the movement of each roof mirror is along a single axis (24,26). This is mechanically simpler to achieve than a combined XY motion of two mirrors or XYZ motion of three mirrors.

The invention has been described in relation to a scanning system but this is only for convenience of illustration. The concept of this invention may also be used in a non-scanning system in which object and image are stationary. In this system the full frame of the object plane is exposed simultaneously upon a corresponding full frame at the image plane. This would of course necessitate a flat plate or belt photoconductor in place of the drum 14.

FIG. 3 is a diagram of a penta prism 30 shown in a position relative to optical axis 8 to correspond to the position of roof mirror 20 in FIGS. 1 and 2. Such a prism may be used as the full equivalent of mirrors 20 and 22. The term roof reflector in the appended claims is intended to include such a prism.

The foregoing description of several embodiments of this invention is given by way of illustration and not of limitation. The concept and scope of the invention are limited only by the following claims and equivalents thereof which may occur to others skilled in the art.

What is claimed is:

1. A variable magnification optical system for projecting an image along an optical axis and including the following disposed along said optical axis:
   a fixed object plane,
   a fixed image plane,
   a projection lens to project an image from said object plane to said image plane, and
   a double reflector to deflect said optical axis by 90°, said double reflector being movable as a unit along a path which bisects said 90° deflection of said optical axis, whereby said optical axis is varied in length and held from lateral and angular displacement.

2. A variable magnification optical system as defined in claim 1 in which said projection lens is movable along said optical axis to accommodate change in magnification.

3. A variable magnification optical system for projecting an image along an optical axis and including the following disposed along said optical axis:
a fixed object plane,
a fixed image plane,
a projection lens to project an image from said object plane to said image plane,
an object double reflector on the object side of said lens to deflect said optical axis by 90°, said object double reflector being movable as a unit along a path which bisects said 90° deflection of said optical axis whereby said optical axis between said object plane and said lens is varied in length and held from lateral and angular displacement, and
an image double reflector on the image side of said lens to deflect said optical axis by 90°, said image double reflector being movable as a unit along a path which bisects said 90° deflection of said optical axis whereby said optical axis between said lens and said image plane is varied in length and held from lateral and angular displacement,
whereby object and image distances relative to said lens are varied to suit the requirements of different image magnifications.

4. A variable magnification system as defined in claim 3 in which said lens is movable in addition to said double reflectors to suit the requirements of different image magnifications.

5. A variable magnification optical system for projecting an image along an optical axis and including the following disposed along said optical axis:
a fixed object plane,
a fixed image plane,
a projection lens to project an image from said object plane to said image plane, and
a double reflector unit to deflect said optical axis and including two planar reflective surfaces disposed relative to each other at an angle therebetween,
said double reflector unit, including said two reflective surfaces, being integrally movable on a path bisecting the angle of deflection of said optical axis whereby said optical axis is varied in length and concurrently held from lateral and angular displacement.

6. The variable magnification optical system of claim 5, wherein said angle is 45° and said optical axis is deflected by 90°.

7. The variable magnification optical system of claim 5 wherein said acute angle is 45° and said optical axis is deflected by 90°.

8. A variable magnification optical system for projecting an image along an optical axis including the following disposed along said optical axis:
a fixed object plane,
a fixed image plane,
a projection lens to project an image from said object plane to said image plane, said projection lens being movable along said optical axis to accommodate a change in magnification, and
a double reflector unit to deflect said optical axis and including two planar reflective surfaces disposed relative to each other at an acute angle therebetween,
said double reflector unit, including said two reflective surfaces, being integrally movable on a path bisecting the angle of deflection of said optical axis whereby said optical axis is varied in length and concurrently held from lateral and angular displacement.

* * * * *